United States Patent [19]

Ichiro et al.

[11] Patent Number: 4,830,337

[45] Date of Patent: May 16, 1989

[54] DEVICE FOR PUSHING AND PULLING AN ACCESSORY INSTRUMENT OF MANUFACTURING PLANT

[75] Inventors: Kitaura Ichiro; Tamura Shuichi; Yonezawa Keitaro, all of Itamishi, Japan

[73] Assignee: Aioi Seiki Kabushiki Kaisha, Hyogoken, Japan

[21] Appl. No.: 702,123

[22] Filed: Feb. 15, 1985

[30] Foreign Application Priority Data

Feb. 17, 1984 [JP]  Japan .................................. 59-29331

[51] Int. Cl.⁴ ............................................. F16H 29/02
[52] U.S. Cl. .................................. 254/95; 254/DIG. 6
[58] Field of Search ................... 74/89.21, 250, 501 R, 74/501.5 R, 502; 254/95, 97, 4 R, 47, DIG. 6; 414/18, 14-16, 214, 46; 198/795, 321, 678

[56] References Cited

U.S. PATENT DOCUMENTS

| | | | |
|---|---|---|---|
| 3,679,174 | 7/1972 | Boettcher | 74/89.21 |
| 3,719,291 | 3/1973 | Redam | 254/DIG. 6 |
| 3,746,190 | 7/1973 | Hotz | 254/DIG. 6 |
| 3,831,455 | 8/1974 | Patrignani | 74/89.21 |
| 4,331,219 | 5/1982 | Suzuki | 254/4 R |
| 4,402,642 | 9/1983 | Klancnik et al. | 254/DIG. 6 |

*Primary Examiner*—Robert C. Watson
*Attorney, Agent, or Firm*—Lowe, Price, LeBlanc, Becker & Shur

[57] ABSTRACT

The present invention relates to a device for pushing and pulling an accessory instrument of a manufacturing plant, such as a clamp for a metallic mould, by means of a chain driven by a hydraulic actuator having a vertical cylinder. One end of the chain is supported by a case which houses the chain. The chain is driven by one of more sprockets engaging the chain at and rotatably supported by a movable part of the cylinder.

16 Claims, 7 Drawing Sheets

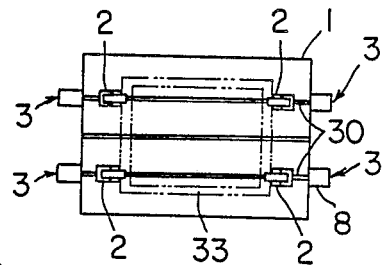
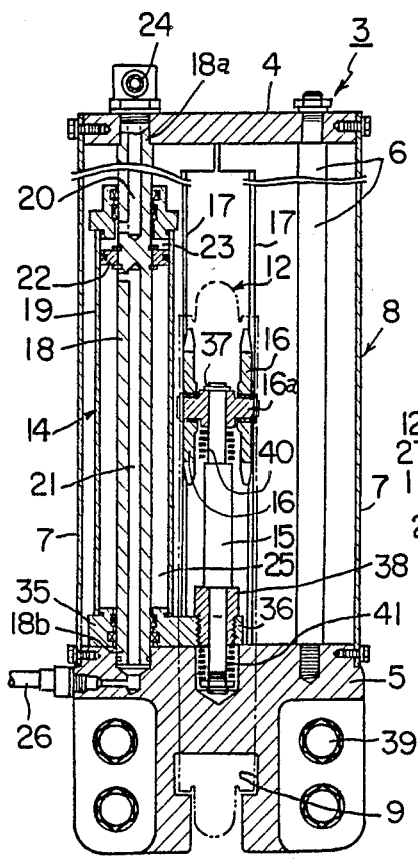
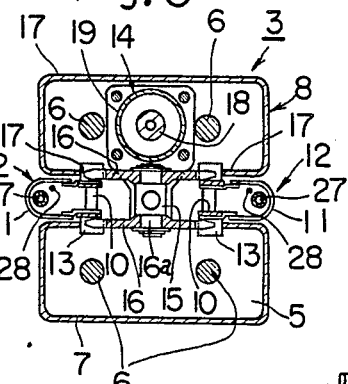
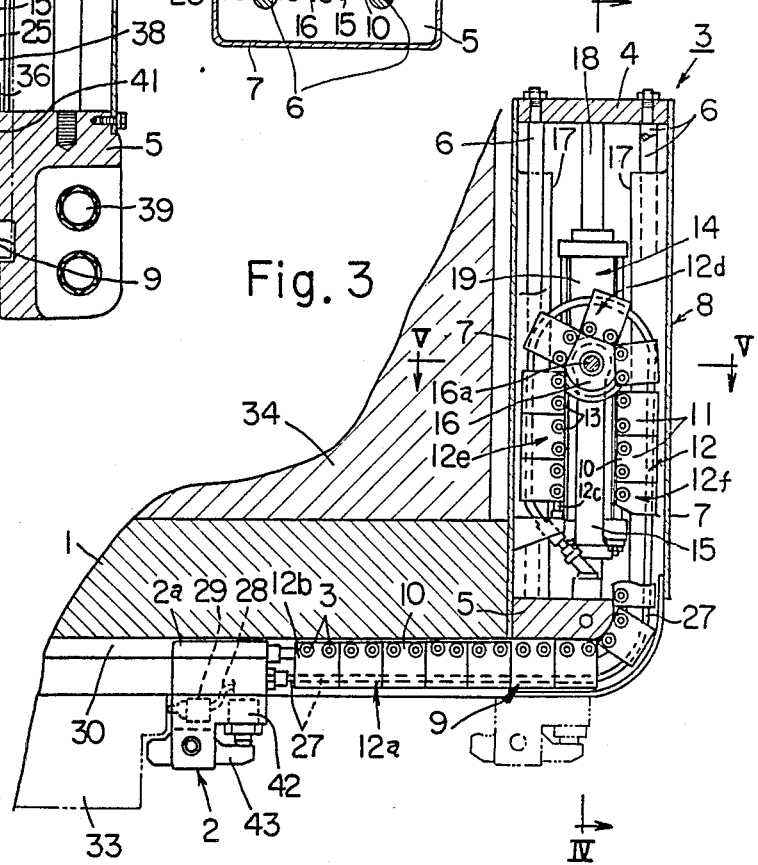

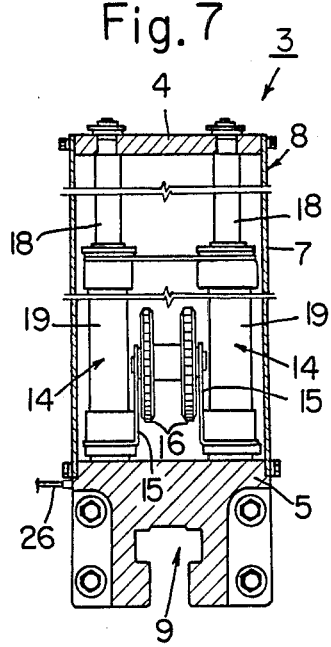
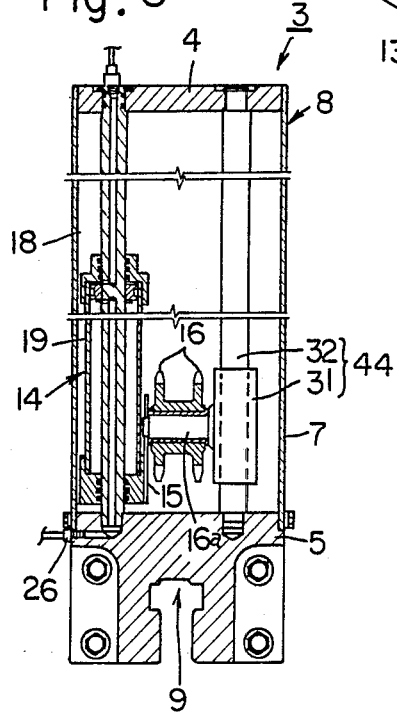
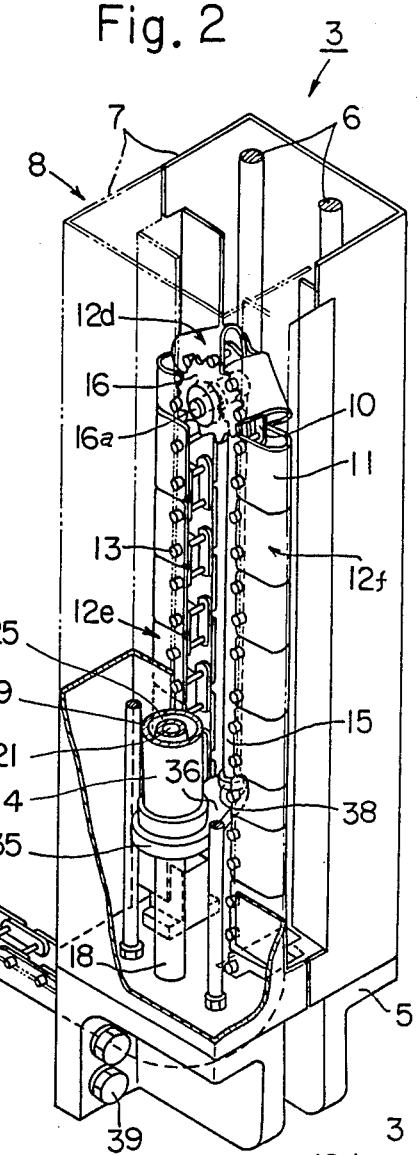
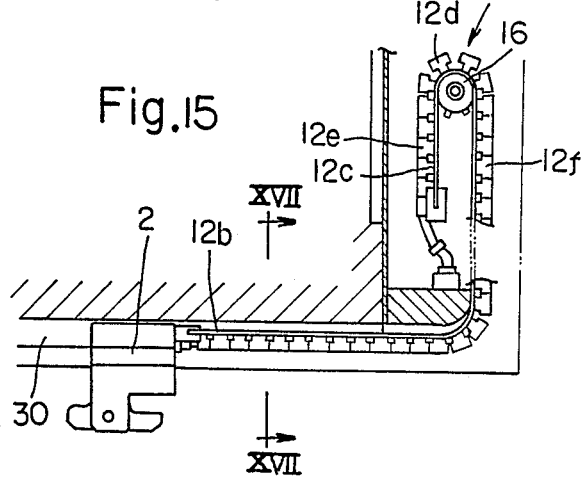

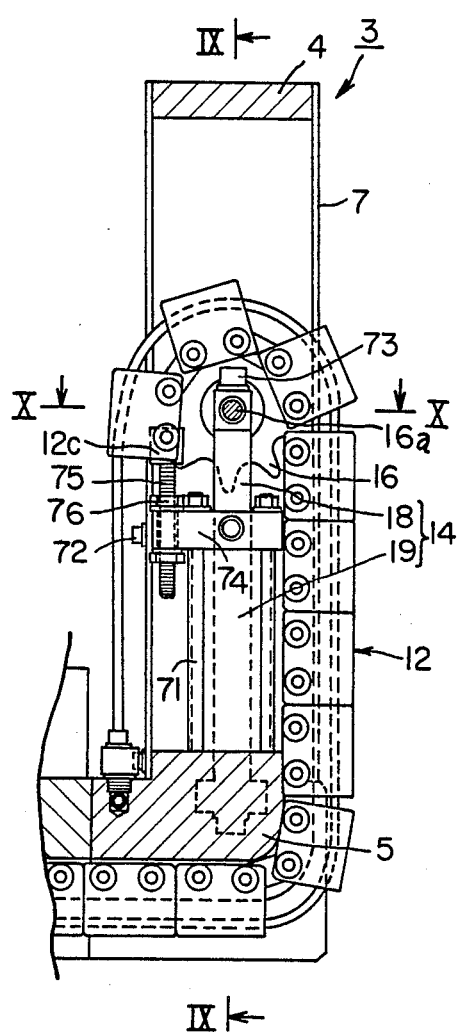
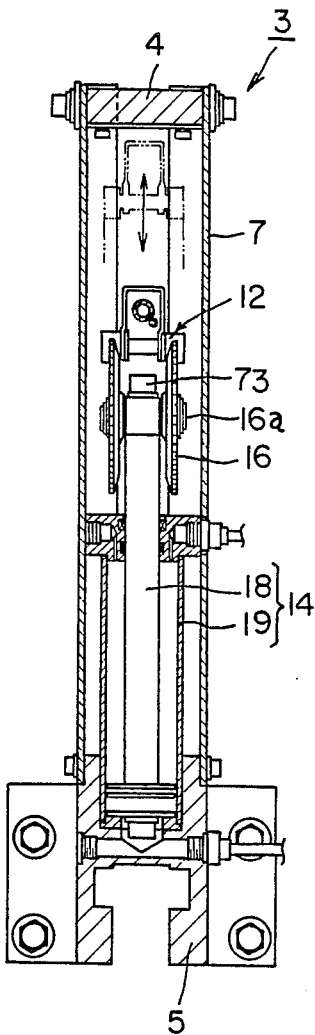
Fig. 8
Fig. 9
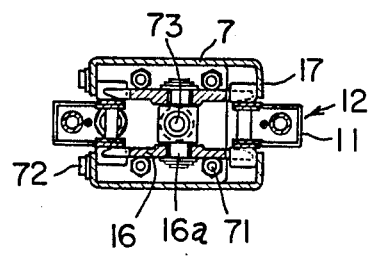
Fig. 10

Fig 11
Fig 12
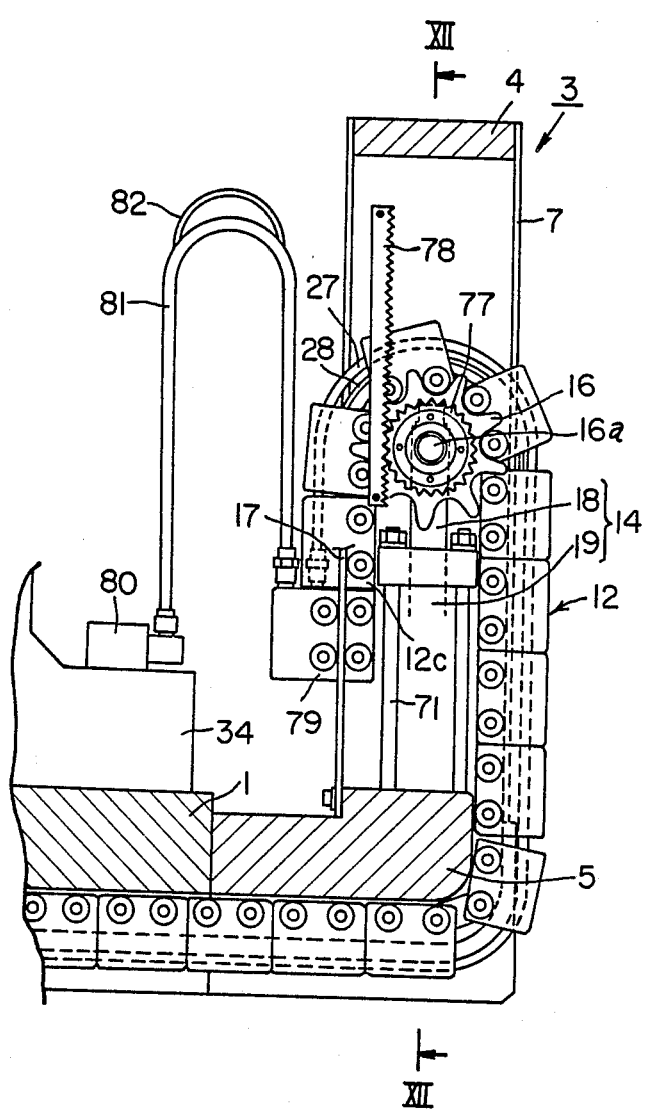
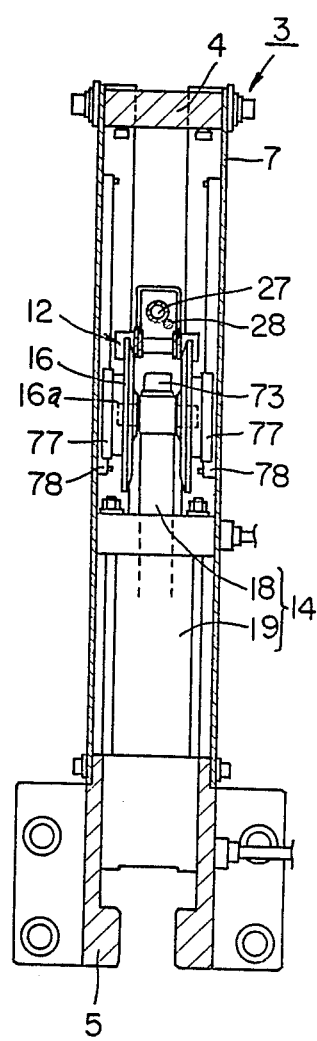

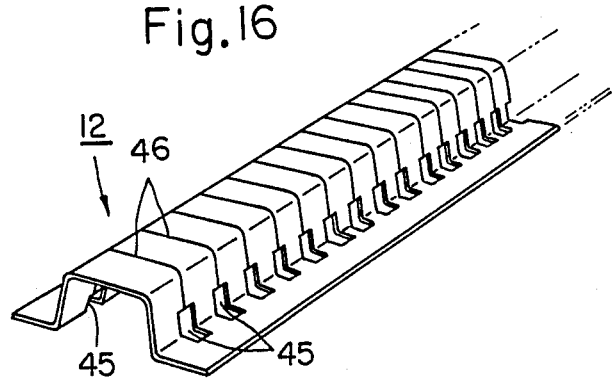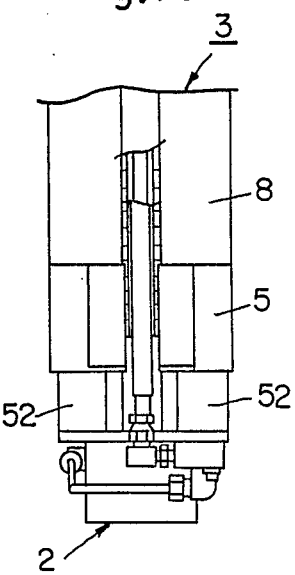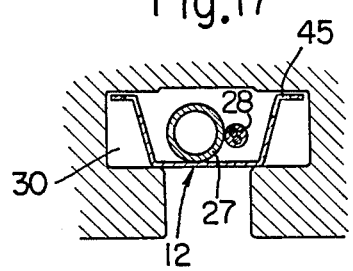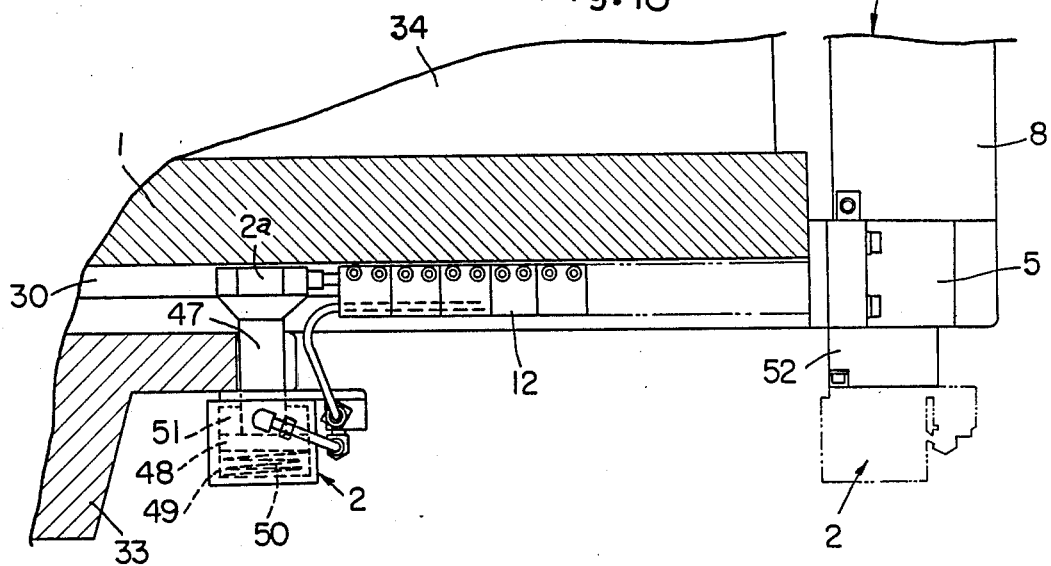

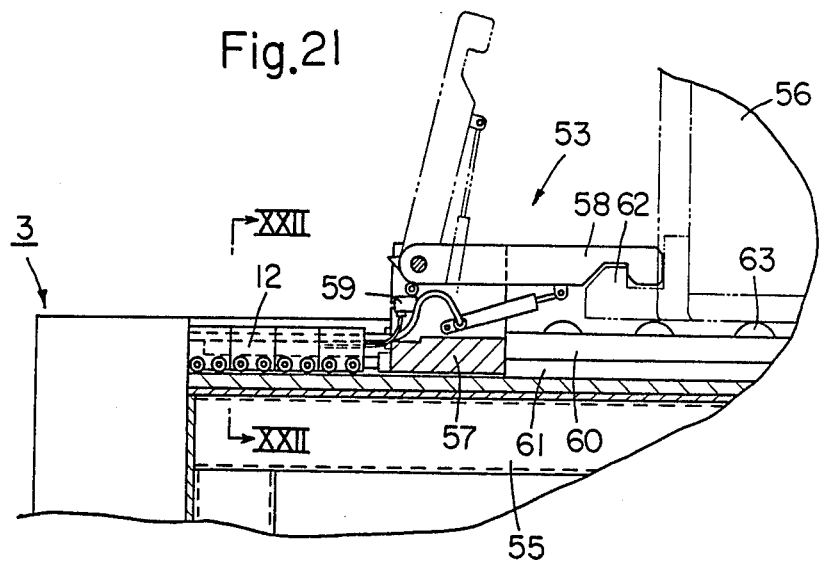
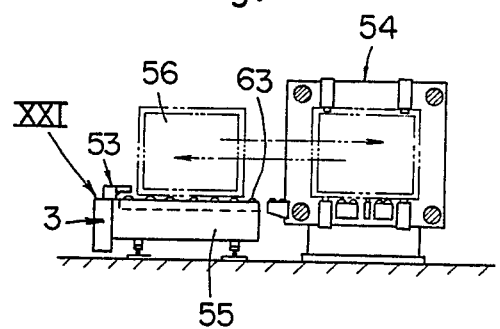
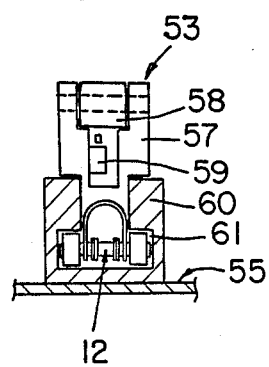

DEVICE FOR PUSHING AND PULLING AN ACCESSORY INSTRUMENT OF MANUFACTURING PLANT

BACKGROUND OF THE INVENTION

1. Field of the invention

The present invention relates to a device for pushing and pulling an accessory instrument used in a manufacturing process especially such a device which pushes and pulls an accessory instrument horizontally by means of finite chains functioning as thrust and tension elements driven by hydraulic actuators, In this specification, the term "accessory instrument" includes a clamp for fixing a metallic mould on a bolster, for example. or a slider of a press, or as a means for fixing a work pallet on a table of a machining tool, or apparatus functioning as a hook for carrying a metallic mould or a work pallet between a feeding table and a machine such as a press, an injection molding machine, a machining center, etc. The term 'finite chain' refers to a chain which is allowed to kink in one direction but not the other opposite direction beyond linear alignment of adjacent links.

2. Background Art

When a finite chain is used as a horizontal thrust and tension element to push and pull an accessory instrument, such as a clamp, it is required to locate the chain within its housing in a vertical direction. The chain type jack device is therefore basically provided with a vertically elongated housing having an opening at an upper or lower end of one lateral side thereof through which the finite chain is fed. The chain is housed vertically in said case and kinks to extend through the opening in the horizontal direction. A hydraulic actuator drives the chain vertically within the housing to pass the chain through said opening in order to push or pull the accessory instrument in lateral directions, which instrument is connected to one end of the chain extending through the opening.

A known device for pushing and pulling an accessory instrument is descried, for example, in U.S. Pat. No. 4,326,624, wherein a finite chain is driven by a sprocket 28 actuated by a hydraulic motor to function as a thrust and tension element.

However, the use of a hydraulic motor is disadvantageous for several reasons. First, it is expensive and complex in structure. Second, it is subject to damage when subjected to acceleration greater than 30 G. Thirdly, it is subject to loss of power to compensate for the leakage of fluid in the motor when the instrument is maintained in the working position or the retreated position. Fourth, it must be provided with a braking system to eliminate the loss of power problem mentioned above.

SUMMARY OF THE INVENTION

A primary object of the present invention is to eliminate the loss of power problem during the time when an accessory instrument is kept in the working position or the retreated position, without reliance upon any braking system.

Another object of the present invention is to provide a chain type jack that is economical by employing an actuator which has a structure simpler than a hydraulic motor and is more rugged and reliable in operation.

A further object of the present invention is to reduce the overall height of the jack device.

To attain the various objects described above, the device according to the present invention includes as the actuator a hydraulic or pneumatic cylinder instead of a hydraulic motor, disposed vertically in the vertically elongate housing in which a finite chain is house.

More specifically, one or more finite chains are housed and kinked in U-shape in the housing and one end of said chain is fixed to or supported by the housing at an upper or lower portion thereof where an opening for feeding out and hauling back the chain is provided. One or a pair of sprockets is engaged with the kinked part of said chain, and held freely rotatable by a movable part of the cylinder. The rising and falling parts of the chains, which continue to the kinked part(s) thereof are disposed parallel and guided by one or two pairs of chain guides which are fixed to the housing and contacted with outer sides of the individual rising or falling chain parts, so as to prevent their outward expansion.

BRIEF DESCRIPTION OF THE DRAWINGS

The present invention will be better understood and objects other than those set forth above will become apparent when consideration is given to the following detailed description thereof.

FIG. 1 is a bottom plan view of a slider of a press which is provided with a device according to the present invention;

FIG. 2 is a partially sectioned perspective view of the device according to the first preferred embodiment of the present invention;

FIG. 3 is a vertical section of the device according to the first preferred embodiment of the present invention;

FIG. 4 is a vertical section taken along the line IV—IV in FIG. 3;

FIG. 5 is a horizontal section along the line V—V in FIG. 3;

FIGS. 6 to 22 show various modifications of the first embodiment of the present invention, wherein:

FIG. 6 is a vertical section of the second preferred embodiment according to the present invention;

FIG. 7 is a vertical section of the third preferred embodiment according to the present invention;

FIG. 8 is a vertical section of the fourth preferred embodiment according to the present invention;

FIG. 9 is a vertical section along the line IX—IX in FIG. 8;

FIG. 10 is a lateral section along the line X—X in FIG. 8.

FIG. 11 is a vertically sectioned front view of the fifth preferred embodiment of the present invention;

FIG. 12 is a vertical section along the line XII—XII in FIG. 11;

FIG. 13 is a vertically sectioned front view of the sixth preferred embodiment of the present invention;

FIG. 14 is a lateral section along the line XIV—XIV in FIG. 13;

FIG. 15 is a schematic front view of the seventh preferred embodiment of the present invention;

FIG. 16 is a fragmentary perspective view of a chain used in the seventh preferred embodiment;

FIG. 17 is a vertical section along the line XVIII—XVIII in FIG. 15;

FIG. 18 is a fragmentary and partially sectioned front view of the eighth preferred embodiment of the present invention;

FIG. 19 is a right side view of the eighth preferred embodiment of the present invention;

FIG. 20 is a front view of the ninth preferred embodiment of the present invention which is applied to a metallic mould exchanger for an injection forming machine;

FIG. 21 is an enlarged and vertically sectioned front view of a part designated by the arrow XXI in FIG. 20;

FIG. 22 is a vertical section along the line XXII—XXII in FIG. 21.

DETAILED DESCRIPTION OF THE PREFERRED EMBODIMENTS

Figure 13:
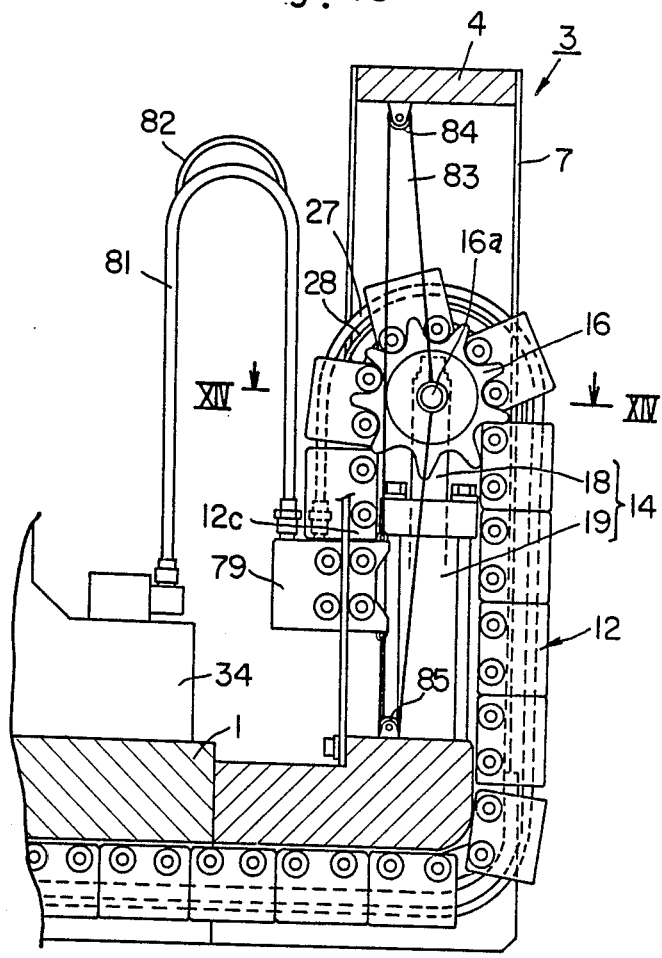

Referring to FIGS. 1 to 5, explanation will be given of a device according to the first preferred embodiment of the present invention, which is adapted for use in a press for pushing and pulling clamp clamping an upper metallic mould connected thereto.

As seen in FIG. 1, an upper metallic mould 33 is fixed to the bottom surface of the upper mould holder 1 by four clamps. A plurality of T-shaped grooves 30 are formed in the bottom surface of the holder 1. Each clamp 2 is slidably fitted in one of these T-shape grooves 30, so that it may advance or retreat from the upper metallic mould 33 (FIG. 3). The device according to the present invention is disposed laterally outside of each clamp 2, and fixed at the right or left end surface of the holder 1, so as to push and pull each clamp 2 individually.

Further, the device according to the present invention is comprised as seen in FIGS. 2 to 5.

In the drawings, numeral 8 designates a vertically elongated case or housing. The case 8 includes four connected rods 6, a top plate 4 fixed to upper end of the rods, a bottom block 5 fixed to the rod lower ends, and a pair of case walls 7 made of steel channel extending between the top plate 4 and bottom block 5.

The bottom block 5 is fastened with bolts 39 to the right end surface of the metallic mould holder 1 fixed to the slider 34 of the press. In the bottom block 5, an opening 9 is provided for feeding out and hauling back of a chain 12 (L-shaped configuration in elevational view of FIG. 3). The opening 9 communicates with one of T-shaped grooves 30 in the holder 1 at the left end.

As seen in FIG. 3, a finite chain 12 is disposed vertically in case 8 and kinked in U-shape. One end 12c of chain 12 is fixed to case 8 proximate the bottom block 5 and a vertically rising part 12e extends upwardly from the one end 12c, and is arranged in an inverse U-shape (part 12d kinked in U-shape). The chain 12 is kinked to the left at the lowest part of the falling part 12f hung from the right end of the U-turn part 12d, passing through the opening 9, and another end 12b of the chain 12 is led into the T-shaped groove 30 communicating with the opening 9 is order to connect it with the clamp 2. Chain rollers 13 which are located in front and rear sides of the chain 12 are guided by the T-shaped groove 30. T-shaped foot 2a of the clamp 2 is fitted and hung slidably in the T-shaped groove 30.

The chain links 10 of the chain 12 are provided a their outer sides in FIG. 5 with a respective impact or stop plate 11 having a U-shaped cross section. Therefore, as seen in FIG. 3, this chain 12 is freely allowed to kink in one direction, with adjacent links maintained in linear alignment by abutting contact between adjacent plates 11 in the other direction.

Two sprockets 16 are engaged with each row of chain rollers 13 located in front and rear sides of the chain at the U-turn part 12d, respectively. Both sprockets 16 are supported freely rotatably by a shaft 16a at opposite end portions of the shaft 16a.

The rising and falling parts 12e,12f which are in a series with the intermediate U-turn part 12d, are arranged in parallel. The left and right out sides of the rising and falling parts 12e, 12f of the chain 12 are guided individually by vertical chain guides 17 preventing right or left outward movement of these parts 12e,12f. These chain guides 17 include flanges of the channels, i.e., the case walls 7.

A hydraulic actuator supplied with compressed air or hydraulic oil is comprised of a double rod cylinder 14. More specifically, the cylinder 14 is disposed vertically behind the chain 12, and the upper end 18a of the piston rod 18 is fixed to the top plate 4, and the lower end 18b thereof to the bottom block 5. The cavity in the cylinder barrel 19 is divided into two chambers by the piston 22, i.e., a lifting chamber 23 on the piston 22 and a dropping chamber 25 under the piston 22. The lifting chamber 23 is supplied and drained with working fluid from a tube 24 connected through top plate 4 to a passage 20 drilled in the upper half of the piston rod 18, in connection with chamber 23. The dropping chamber 25 is supplied and drained with working fluid from another tube 26 connected thereto through the bottom at the front side of block 5, and another passage 21 drilled in the lower half of the piston rod 18. Thus, the barrel 19 is moved up when the lifting chamber 23 is supplied with fluid and expanded, and is moved down when the dropping chamber 25 is supplied with fluid and expanded.

The shaft 16a supporting the sprockets 16 is located between the top and bottom of the cylinder barrel 19, preferably at about the middle thereof.

The shaft 16a is supported by a stand 36, formed integrally with the bottom cover 35 of the barrel 19 and projected to the ore side therefrom, and a column 15.

The shaft 16a is fitted slidably up and down on the upper part of the column 15 and biased upwardly against the stopper ring 37 by a buffer spring 40. The column 15 is fitted slidably up and down at the lower part thereof into a cylindrical support 38 which is fastened to the stand 36, and biased by another buffer spring 41 downwardly so that it is received by the top surface of the support 38.

As seen in FIG. 3, the clamp has a limit switch 29 and a clamp cylinder 42. The limit switch 29 will be turned on when it has advanced into contact with the upper metallic mould 33, enabling electric wire 28 to transmit a signal to the control system (not shown) for changing the position of a directional control valve (not shown) in the clamping position. Then, working fluid is fed into the clamp cylinder 2 through a hydraulic hose 27, and the upper metallic mould 33 is clamped against the holder 1 by the clamp arm 43.

The hydraulic hose 27 and the electric wire 28 extend through an interior formed within stop plates 11 that shields the hose and wire from collision with or hooking to other objects; the hose and wire are connected to the clamp 2 and the limit switch 29, respectively, with the other ends thereof fixed on the bottom block 5 of the case 8.

Explanation will now be provided as to the manner in which the cylinder 14 pushes and pulls the clamp 2 through the chain 12.

Clamp 2 is retracted from left to right in FIG. 3 in response to working fluid (hydraulic oil or compressed air) fed into the lifting chamber 23 via upper tube 24. To this end, the chamber 23 is expanded to lift up the cylinder barrel 19, and the sprockets 16; therefore the clamp 2 is drawn to the right by the chain 12 being retracted into the case 8.

In this case, the clamp 2 is drawn two times the length of the cylinder lift or stroke, because the chain 12 is hauled to along both the rising and falling parts 12e, 12f, which are hung from each side of the sprockets 16, respectively. In other words, the lift or stroke of the cylinder 14 may be minimized by a half length of the travelling stroke of the clamp 2, therefore, the height of the cylinder may become small.

To extend the clamp 2 by pushing it toward the left in FIG. 3, working fluid is fed into the dropping chamber 25 through the lower tube 26, and the chamber 25 is expanded to lower the cylinder barrel 19 and sprockets 16. The sprockets 16 are turned clockwise to drive the rising part 12e of the chain 12, via U-turn part 12d, toward falling part 12f thereof. As a result, the clamp 2 is pushed toward the left.

The chain 12 is prevented from kinking toward the side on which impact or stop plates 11 are provided, beyond the point of linear alignment thereof, and also do not expand outward along the rising and falling parts 12e, 12f by virtue of the chain guides 17, or along the horizontal part 12a led out of the case 8 by virtue of the T-shaped groove 30. Therefore, the clamp 2 is pushed powerfully.

FIG. 6 shows the second preferred embodiment of the present invention, wherein a vertical guide system 44 for the sprockets 16 is provided (in the first preferred embodiment described above), enabling sprockets 16 to move smoothly up and down.

Namely, a vertical guide posts 32 is disposed in front of the sprockets 16 within the case 8, and the upper end of the post 32 is fixed to the top plate 4, with the lower end thereof fixed to the bottom block 5. A cylindrical slider 31 is slidably fitted to the post 32 and is guided thereby. The front end of the shaft 16a for the sprockets 16 is fastened to the slider 31, and the rear end thereof to the supporting member 15 which is fixed to the cylinder barrel 19.

In the third preferred embodiment of the present invention, the first preferred embodiment is modified as seen in FIG. 7. Namely, two double rod cylinders 14 are disposed at front and rear sides of the sprockets 16, respectively, in order to attain a more powerful and smoother actuation.

In the fourth preferred embodiment of the present invention, the first preferred embodiment is also modified as seen in FIGS. 8 to 20. Namely, a hydraulic cylinder 14 comprises a single rod cylinder instead of a double rod cylinder.

The cylinder barrel 18 is fitted at its lower end into the bottom block 5 of the case, and the upper flange 74 is fixed to the bottom block 5 by through bolts 71 and to the case wall 7 at a middle height thereof by the other bolts 72. The shaft 16a supporting sprockets 16 is fixed to the top of the piston rod 18 by a bolt 73. An end 12c of the chain 12 is connected to the upper flange 74 by a bolt 75 and nut 76. The flanges of the steel channels, namely, the case walls 7, function as the chain guides 17. Therefore, in this embodiment, the impact or stop plates 11 project right and left from the case 8.

In the fifth embodiment shown in FIGS. 11 and 12, the fourth preferred embodiment is modified to rotate the sprockets 16 by means of a pair of pinion gears 77 and racks 78.

Namely, a pair of pinion gears are fixed to the respective outer end face of each sprocket 16. The rack rails 78 which are to be engaged with the pinion gears 77 are fastened to the inside of the case walls 7 to extend vertically. One end 12c of the chain 12 is vertically movably fixed to the case 8 by means of vertical carriage 79 smoothly guided by the chain guide 17 of the case wall 7 to move therealong. A connecting hose 81 and electric wire 82 are suspended between a fixed connector 80 on the slider 34 and the vertical carriage 79 to connect them with the hydraulic hose 27 and the electric wire 28.

Operation of this embodiment will be described below.

During the elevation of the piston rod 18, the pinion gears 77 are forced to rotate by engagement with the rack rails 78 so as to accelerate the sprockets 16; consequently, the chain 12 will actuate the clamp 2 by three times the length of the lift or stroke of the piston rod 18. The one end 12c of the chain 12, carried by the vertical carriage 79 is moved in a vertical direction accordingly.

Figure 14:
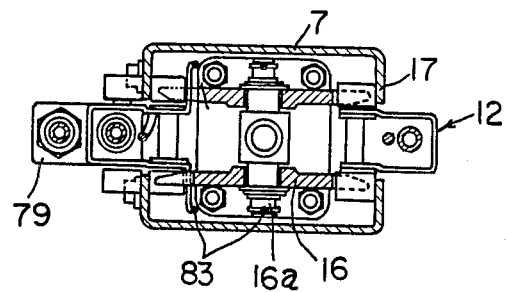

In the sixth preferred embodiment of the present invention, the fifth preferred embodiment is modified to comprise a cable 83 instead of the pinion gears 77 and 78, as seen in FIGS. 13 and 14.

Idler pulleys 84, 85 are provided at the upper end lower part in the case 8. A cable 83 is would about these pulleys 84, 85. The right side of the cable 83 is fixed to the shaft 16a of the sprockets 16, and the left side to the one end 12c of the chain 12 intermediate vertical carriage 79. Thus, the one end 12c of the chain 12 is driven counter to the cylinder rod 18 by the cable 183. Namely, the carriage 79 is lifted up when the sprockets 16 are lowered, and lowered when the sprockets 16 are lifted up, so that the chain 12 is driven three times the length of the cylinder stroke or lift.

The seventh preferred embodiment of the present invention shown in FIGS. 15 to 17, may be applied to any of the foregoing embodiment.

In this embodiment, the chain 12 is made from a series of steel hoops in order to decrease the productive coast by simplifying he structure thereof.

Namely, a series of steel hoops is formed in hat shape sectionally for overall length. Then, the gear holes 45 which will be engaged with the sprockets 16 are cut through at both folding lines in the regulated pitch along the length. And respective cutting 36 which is extended from the hole 45 at one side via rib to the hole 45 at another side is also cut through the hat shaped hoop.

The eighth preferred embodiment of the present invention shown inn FIGS. 18 and 19, may be applied to any of the foregoing embodiment.

In this preferred embodiment, the clamp 2 may be fixed to a dummy block 52 located at the retracted position when the clamp 2 is retracted. to this end, the upper metallic mould holder may be installed with many clamps 2 to prepare for various mould, and necessary ones of these clamps 2 may be selectively chosen for use, with the rest of the clamps 2 fixed to prevent their random movement caused by variations in acceleration acting on the cylinder 14 or the chain 12 during the operation of the press.

Namely, a pair of front and rear dummy blocks 52 are fixed to the bottom surface of the bottom block 5. The clamp 2 is of a cylinder actuating type. A piston 48 is fixed to the T-shaped foot 2a of the clamp 2 by rod 47. A cylindrical head 49 which is externally fitted to the piston 48 is depressed by a spring 50 towards the unclamped position and is lifted to the clamping position by hydraulic pressure admitted in the receiving chamber 51 when a metallic mould 33 is to be clamped.

The clamp 2 will clamp the dummy block 52, as presented by dotted line in FIG. 18, using the cylindrical head 49. It is preferably that the height of the dummy block 52 be as tall as the clamping part of the upper metallic mould.

The ninth preferred embodiment of the present invention is adapted to be used with a mould carriage 55 for exchange of moulds in an injection moulding machine 54, i.e., to push and pull the moulds for exchange.

The structure of this preferred embodiment is basically similar to anyone of the foregoing embodiments, except that the structure is inverted, i.e., this will serve to push and pull a hooking instrument 53 instead of a clamp 2.

The device according to the present invention is disposed on the opposite side of the mould carriage 55 with respect to the injection moulding machine 54. The one end 12b of the chain 12 is connected to the base body 57 of the hooking instrument 53.

The hooking instrument 53 comprises base body 57 and a hook 58 supported pivotably thereby; this hook 58 is movable between the engaged position represented by full line in FIG. 21 and the disengaged position represented by dotted line in FIG. 21. The positioning of the hook 58 to those positions may be detected by a limit switch 59.

The base body 57 is fitted freely slidable in the T-shaped groove 61 formed in a guide rail 60. the guide rail 60 is fixed to the mould carriage 55.

Now, the actuation of the device according to the present invention will be described below.

The hook 58 is engaged with a hooking member 2 of a metallic mould 56 mounted on the mould carriage 55; the chain 12 is then pushed out as a thrust member to move the metallic mould 56 towards the right on the roller conveyor 63 to transfer it into the injection moulding machine 54. After transferring, the hook 58 is disengaged and the hooking instrument 53 will be drawn out towards the left.

The actuation of the device will be carried out in the control abovementioned procedure when the metallic mould 56 will drawn out from the injection moulding machine 54 to the mould carriage 55.

While there are shown and described preferred embodiments of the present invention, it is to be distinctly understood that the invention is not limited thereto, but may be otherwise variously embodied and practiced within the scope of the following claims.

We claim:

1. A mechanical jack, comprising a finite chain functioning as thrust and tension element, an elongated case housing said chain, said case having an opening for extension and retraction of said chain therethrough, and cylinder actuator means for driving said chain, wherein:
   at least one sprocket is disposed movably up and down within said case,
   said cylinder actuator means includes a fluid actuated cylinder having a means movable within said case, and which movable means rotatably supports said at least one sprocket;
   said chain being trained around the periphery of said at least one sprocket, and engaged therewith, and said chain thereby having upwardly and downwardly extending portions arranged generally vertical and generally parallel to each other and of substantially U-shaped configuration in elevation view.

2. A device recited in claim 1, wherein:
   said actuator includes a double rod cylinder having a piston rod fixed at each end thereof to said case, and a moveable cylinder barrel supporting said at least one sprocket.

3. A device recited in claim 1, wherein:
   said actuator means includes a single rod cylinder having a cylinder barrel of said actuator fixed to said case,
   and a piston rod supporting said at least one sprocket.

4. A devices recited in claim 1, wherein:
   said at least one sprocket includes at least one pinion gear having a smaller diameter than that of said sprocket,
   at least one rack fixed to said case engagable with said at least one pinion gear,
   one of said chain being supported movably up and down within said case.

5. A device recited in claim 1, wherein said device further comprises:
   one or more pairs of upper and lower idler pulleys disposed pivotably at upper and lower parts of said case, cable means respectively would about each pair of upper and lower free pulleys,
   one end of said chain movably supported by said cable means, and connected to the movably means of said cylinder actuator means so that said one end is driven in a counter direction to that of said movably means,.

6. A device recited in claim 1, wherein:
   chain rollers are disposed pivotably at outer portions of chain links forming said chain so as to enable said chain rollers to engage with the sprocket.

7. A device recited in claim 1, wherein:
   said finite chain is provided at one side of chain links thereof with plural stop plates each of U-shaped cross section,
   a hydraulic hose and an electric wire, at least one of which is inserted through said stop plates for connection to an accessory instrument.

8. A device recited in claim 1, wherein:
   said finite chain is made from a series of steel hoops formed of hat-shaped cross section, and wherein said hoops are formed with gear holes for engagement with said at least one sprocket at folding lines extending along both ends of the hoop between flanges and lips thereof in a regulated pitch along the chain length.

9. A device recited in claim 1, wherein;
   said case is provided with a dummy block for fixing on accessory instrument thereon.

10. A device recited in claim 2, further including:
    a supporting member adapted to support at one end thereof a shaft for said at least one sprocket, said supporting member having an opposite end fixed to one end of said movable cylinder barrel for movement therewith.

11. A device recited in claim 2, wherein:
    a shaft for supporting said at least one sprocket is mounted to said cylinder barrel and interconnected thereto with at least one buffer springs.

12. A device recited in claim 2, wherein:
    a passage for feeding working fluid to a lifting chamber defined above the piston in said cylinder barrel is formed in an upper half of said piston rod, and another passage for feeding working fluid to a dropping chamber defined below said piston in said cylinder barrel is formed in a lower half of said piston rod.

13. A device recited in claim 2, wherein:
a shaft for supporting said at least one sprocket is supported by the cylinder barrel of said cylinder.

14. A device recited in claim 13, wherein:
a vertical guide post is disposed and fixed in said case supplementally, and said shaft for supporting said at least one sprocket is fixed to a cylindrical slider fitted on said guide post externally slidable in vertical direction.

15. A device recited in claim 2, wherein:
a shaft for supporting said at least one sprocket is supported by two said cylinder barrels of two said cylinders, respectively.

16. The device of claim 1, further including chain guide means for guiding said upwardly and downwardly extending portions to prevent outward deflection within said case.

* * * * *